(No Model.)
A. RICHARDSON.
PIPE COUPLING.
No. 598,158. Patented Feb. 1, 1898.
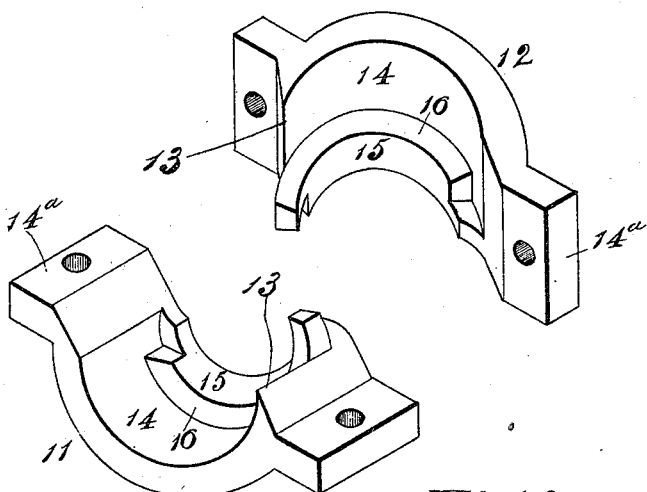
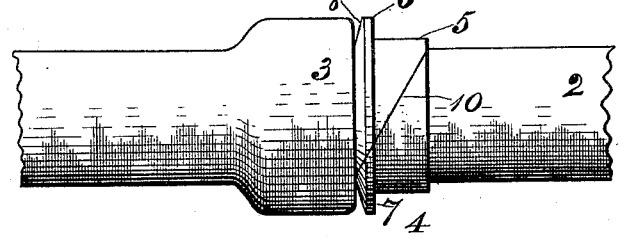
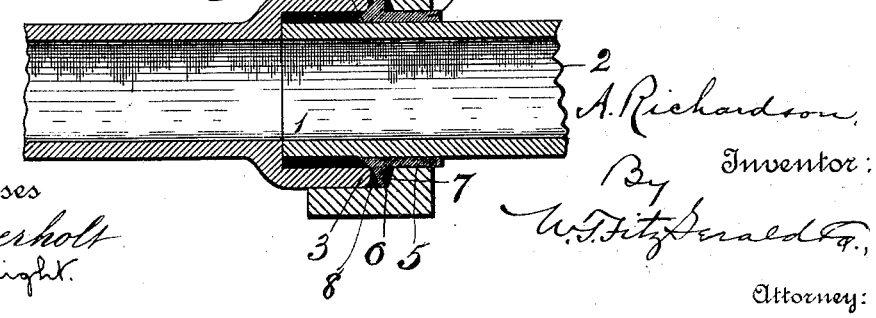
Witnesses
E. E. Overholt
J. F. Knight
A. Richardson, Inventor:
By W. T. Fitzgerald,
Attorney:

United States Patent Office.

AARON RICHARDSON, OF HUNTINGTON, INDIANA.

PIPE-COUPLING.

SPECIFICATION forming part of Letters Patent No. 598,158, dated February 1, 1898.

Application filed March 26, 1897. Renewed January 3, 1898. Serial No. 665,475. (No model.)

*To all whom it may concern:*

Be it known that I, AARON RICHARDSON, a citizen of the United States, residing at Huntington, in the county of Huntington and State of Indiana, have invented certain new and useful Improvements in Pipe-Couplings; and I do hereby declare the following to be a full, clear, and exact description of the invention, such as will enable others skilled in the art to which it appertains to make and use the same.

My invention has relation to pipe-couplings, and more particularly to the reinforcement of lead calking ordinarily employed to close or seal the connecting-surfaces of sections of a pipe.

The object of my invention is to provide a calking device which will be found absolutely reliable for the purpose specified.

The construction and use of my invention will be made fully apparent in the following specification and illustrated in the accompanying drawings, made a part thereof.

In the accompanying drawings, Figure 1 is a detail perspective view showing the parts of the clamp proper separated. Fig. 2 is a side view showing my invention as applied to use, the clamp being removed. Fig. 3 is a longitudinal section of the complete device, showing parts of the pipes secured together.

Figures will be employed to designate the various details involved, the same figure pointing out the same part throughout the views.

In carrying out my invention the small end 1 of the pipe 2 is entered into the flared end or mouth 3 of the contiguous section of the pipe, and between the meeting faces thereof I mount my invention, consisting of the gasket 4 and clamp therefor, the former being preferably formed of lead, though any suitable material for the purpose may be used. Said gasket 4 is constructed in quantities, and therefore in itself constitutes an article of manufacture, and it consists of the body proper, 5, having the integrally-formed wall or flange 6, preferably placed at right angles to the plane of the body. By this construction the inner face 7 of the flange 6 is at right angles to the body, while the outer face 8 thereof is concave, terminating in the annular lip 9, designed to extend around the end of the pipe 1 and into engagement with the inner surface of the outer pipe, thus closing the opening in a reliably efficient manner.

In order to enable the gasket to be readily adjusted to varying diameters of the pipe 1, I prefer to sever it obliquely, as indicated by the line 10, which line of division permits the overlapping ends to accommodate each other when the body is firmly gripped upon and around the pipe 1.

In order to reliably hold the gasket in its operative position thus referred to, I provide the clamping members 11 and 12, each having the overlapping flanges 13, substantially as illustrated. Said flanges consist of the collar 14 and the annular internally-disposed ribs 15. I prefer to so form said ribs that they will each extend at one end beyond the dividing-line between the clamping members, thus more reliably holding them together.

By means of the construction just described the inner face of the members when joined together will present a receiving-seat for the head of the pipe 3, while the ribs, when joined together, will present an opening of less diameter which is adapted to snugly receive the body of the gasket, the offset or shoulder 16 being designed to engage the face 7, and when the members are forced toward the gasket the tendency will be to drive it firmly into its seat, when the locking-bolts, which take through the ears 14ª, formed integrally with the flanges, may be tightly secured in their respective apertures by the usual threaded nuts and suitable washers provided therefor.

When the several parts of my invention have thus been constructed and assembled in their respective operative positions and the locking-nuts tightly turned home upon the locking-bolts, it will be found that the joint has been efficiently closed. If, however, it is deemed necessary to reinforce the clamps, a calking-tool may be employed upon the projecting rim of the body 5, which, it is believed, will absolutely prevent all leakage.

Having thus fully described the construction and use of my improved sealing device for pipe-joints, further description is deemed unnecessary.

What I claim as new, and desire to secure by Letters Patent, is—

1. As an improvement in closures for pipe-joints, the combination with the retaining-clamp, of a yielding gasket, consisting of the body 5 and the annular wall 6, the tapered end 9 of which is designed to be received between the outer surface of one of the pipes and the inner surface of the contiguous pipe, substantially as specified and for the purpose set forth.

2. The herein-described securing device for pipe-joints consisting of a yielding collar, constructed substantially in the manner set forth, in combination with an encircling locking-flange therefor, formed of two members, the one overlapping the other and each provided with a rib formed upon its internal face, as set forth.

In testimony whereof I affix my signature in presence of two witnesses.

AARON RICHARDSON.

Witnesses:
JOHN FRASH,
JOHN J. HART.